(12) United States Patent
Cohenshad

(10) Patent No.: US 12,141,816 B2
(45) Date of Patent: Nov. 12, 2024

(54) SYSTEMS AND METHODS FOR INTERCONNECTING MANUFACTURING NODES AND CONSUMER END POINTS

(71) Applicant: Global Sourcing Network LLC, Chula Vista, CA (US)

(72) Inventor: David Cohenshad, Chula Vista, CA (US)

(73) Assignee: Global Sourcing Network LLC, Chula Vista, CA (US)

( * ) Notice: Subject to any disclaimer, the term of this patent is extended or adjusted under 35 U.S.C. 154(b) by 182 days.

(21) Appl. No.: 17/308,968

(22) Filed: May 5, 2021

(65) Prior Publication Data

US 2021/0350386 A1 Nov. 11, 2021

Related U.S. Application Data

(60) Provisional application No. 63/020,251, filed on May 5, 2020.

(51) Int. Cl.
*G06Q 30/018* (2023.01)
*G06F 9/451* (2018.01)
(Continued)

(52) U.S. Cl.
CPC ........... *G06Q 30/018* (2013.01); *G06F 9/451* (2018.02); *G06Q 10/0637* (2013.01); *G06Q 10/0875* (2013.01); *G06Q 30/0201* (2013.01); *G06Q 30/0633* (2013.01); *G06Q 40/03* (2023.01); *G06Q 50/18* (2013.01)

(58) Field of Classification Search
None
See application file for complete search history.

(56) References Cited

U.S. PATENT DOCUMENTS 7,195,157 B2 3/2007 Swartz et al.
10,445,795 B2 * 10/2019 Wiest ................. G06Q 10/0633
(Continued)

FOREIGN PATENT DOCUMENTS

WO WO-0175541 A1 * 10/2001 ....... G05B 19/41865
WO WO-02067099 A2 * 8/2002 ............. G06Q 10/10
(Continued)

OTHER PUBLICATIONS

Adam et al "Durable Goods Production and Inventory Dynamics: An Application to the Automobile Industry", May 2012, Pages (Year: 2012).*
(Continued)

*Primary Examiner* — Romain Jeanty
(74) *Attorney, Agent, or Firm* — Armstrong Teasdale LLP

(57) ABSTRACT

The present invention comprises a market exchange platform for connecting manufacturers and merchants in a cost and time efficient manner to reduce the cost of goods and to maximize the sales without creating excess inventory. The system may allow for the tracking of orders from a merchant at the inception of a good order to the sale of the good by the merchant. Tracking of a good may allow for each manufacturer to be rated on their efficiency in terms of both cost and time which may allow for various vendor ratings to be assigned to each of the manufacturers and merchants using the market exchange platform.

11 Claims, 5 Drawing Sheets

(51) Int. Cl.
*G06Q 10/0637* (2023.01)
*G06Q 10/0875* (2023.01)
*G06Q 30/0201* (2023.01)
*G06Q 30/0601* (2023.01)
*G06Q 40/03* (2023.01)
*G06Q 50/18* (2012.01)

(56) References Cited

U.S. PATENT DOCUMENTS

| | | | | |
|---|---|---|---|---|
| 2009/0150304 A1* | 6/2009 | Hahn-Carlson | ... | G06Q 30/0283 705/400 |
| 2009/0210350 A1* | 8/2009 | Orre | ... | G06Q 50/04 700/107 |
| 2009/0327179 A1* | 12/2009 | Strassner | ... | H04L 41/5003 706/14 |
| 2014/0164255 A1* | 6/2014 | Daly | ... | G06Q 10/0631 705/80 |
| 2015/0134502 A1* | 5/2015 | Chugh | ... | G06Q 40/04 705/37 |
| 2015/0206237 A1* | 7/2015 | Li | ... | G06Q 40/04 705/37 |
| 2018/0123779 A1* | 5/2018 | Zhang | ... | H04L 9/3297 |
| 2018/0144314 A1* | 5/2018 | Miller | ... | G06Q 20/405 |
| 2020/0302480 A1 | 9/2020 | Busch | | |

FOREIGN PATENT DOCUMENTS

| | | | | |
|---|---|---|---|---|
| WO | WO-03036425 A2 * | 5/2003 | ... | G06F 17/27 |
| WO | WO-2007055618 A2 * | 5/2007 | ... | G06Q 10/00 |
| WO | WO-2018011267 A1 * | 1/2018 | ... | H04L 9/0825 |

OTHER PUBLICATIONS

Desai et al (Checking Correctness of Business Contracts via Commitments), May 2008, International Foundation for Autonomous Agents and Multiagent Systems (www.ifaamas.org), pp. 787-794 (Year: 2008).*

* cited by examiner

SYSTEMS AND METHODS FOR INTERCONNECTING MANUFACTURING NODES AND CONSUMER END POINTS

FIELD OF THE INVENTION

The present invention relates to system controls and efficiencies in the manufacture, distribution and sale of goods, and, more particularly to systems and methods for interconnecting manufacturing nodes and consumer end points.

BRIEF SUMMARY OF THE INVENTION

The present invention provides for a market exchange platform for connecting manufacturers and merchants in a cost and time efficient manner to reduce the cost of goods and to maximize the sales without creating excess inventory. The system may allow for the tracking of orders from a merchant at the inception of a good order to the sale of the good by the merchant. Tracking of a good may allow for each manufacturer to be rated on their efficiency in terms of both cost and time which may allow for various vendor ratings to be assigned to each of the manufacturers and merchants using the market exchange platform.

The present invention may also help improve cash flows by handling access to credit facilities and the like and by, for example, leverage holdings in value arising throughout the chain of commerce handled through the market exchange platform.

The present invention may provide a computer-implemented engine for generating a verified business contract, over a network, responsively to input company information comprising at least one certified information input, comprising a graphical user interface capable of locally querying a contract requester for the input company information comprising at least general company information, at least one company attribute, company presence information, third party market information, and the at least one certified information input, at least one network port capable of remotely receiving the company information from said graphical user interface, at least one rules engine communicatively connected to said at least one network port, and comprising a plurality of rules to generate, responsively to the input company information, at the verified business contract of the company.

The present invention provides for a computer-implemented engine for generating a verified business contract, over a network, responsively to input company information comprising at least one certified information input, comprising a graphical user interface capable of locally querying a contract requester for the input company information comprising at least general company information, at least one company attribute, company presence information, third party market information, proposed goods to be purchased, and the at least one certified information input, at least one network port capable of remotely receiving the company information from said graphical user interface, at least one rules engine communicatively connected to said at least one network port, and comprising a plurality of rules to generate, responsively to the input company information, at least one verified business contract of the company correspondent to the proposed goods to be purchased. The plurality of rules may comprise an indication of time correspondent to the validity of the at least one verified business contract and the at least one verified business contract may comprise a purchasing plan.

The present invention provides for a method for purchasing and distributing goods, comprising receiving through a user interface an intention to purchase at least one good based at least on one term, evaluating the intention to purchase based on the at least one term and an attribute of the purchaser, creating a contract to purchase the at least one good, and receiving an indication of acceptance of the contract and production of the at least one good may be started. An attribute may comprise a value correspondent to at least one financial rating of the company and a value correspondent to at least one financial rating of the company. The at least one term may be selected from the group consisting of delivery date, quality of good, cost of good, delivery location, materials used, and fulfilment amount.

The present invention may also more easily facilitate licensing relationship and create broader use and exploitation of various copyrighted and other intellectual property. For example, the market exchange platform may have included therein a license repository in which various licenses and other intellectual property germane to a potential good may be purchased or otherwise aligned with a produced good, regardless of whether or not the manufacturer or merchant had prior access or permission to use the licensed material.

BRIEF DESCRIPTION OF THE DRAWINGS

This disclosure is illustrated by way of example and not by way of limitation in the accompanying figure(s). The figure(s) may, alone or in combination, illustrate one or more embodiments of the disclosure. Elements illustrated in the figure(s) are not necessarily drawn to scale. Reference labels may be repeated among the figures to indicate corresponding or analogous elements.

The detailed description makes reference to the accompanying figures in which.

DETAILED DESCRIPTION

Figure 1:
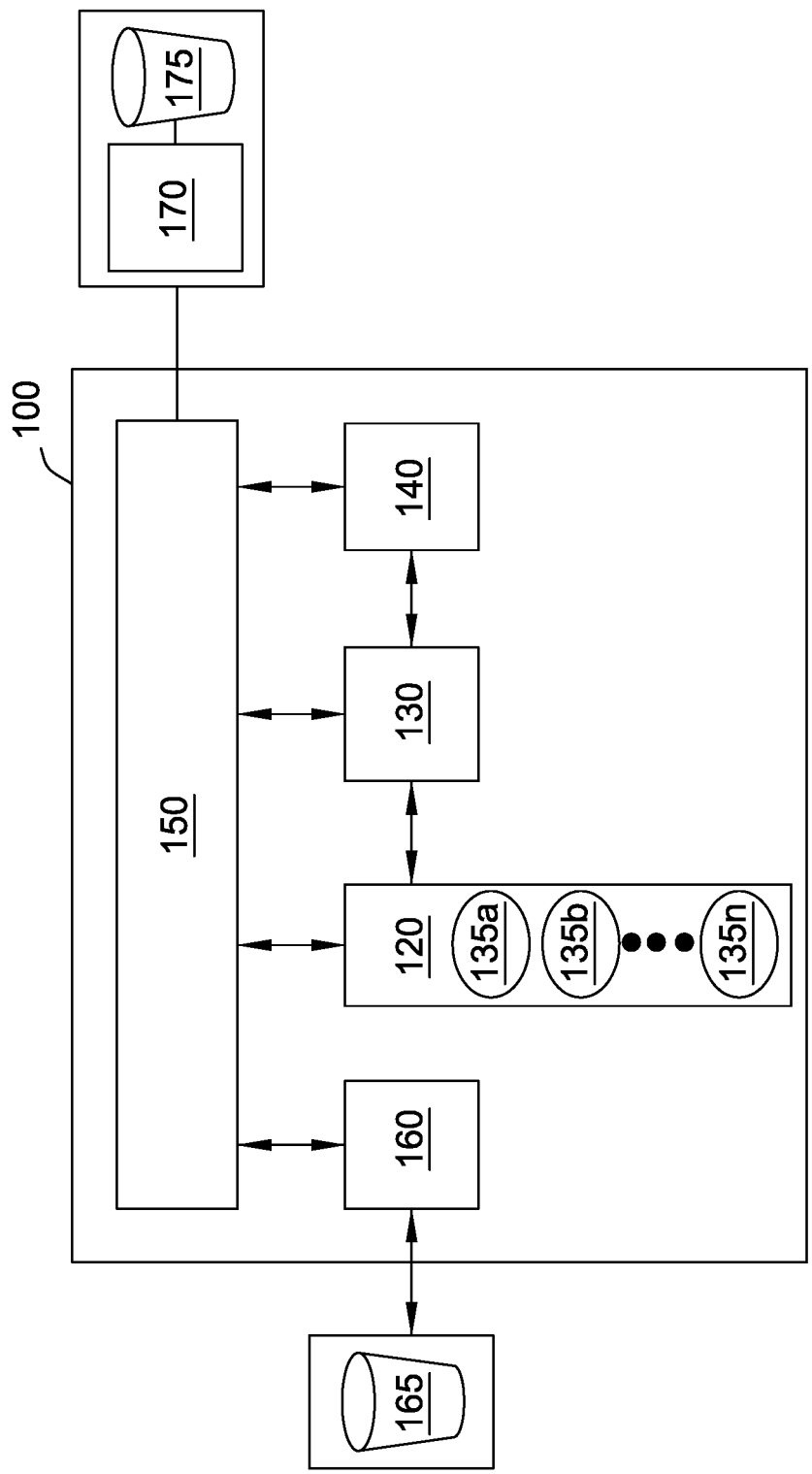
FIG. 1 is an embodiment of the present invention.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that exemplary embodiments may be embodied in different forms. As such, the exemplary embodiments should not be construed to limit the scope of the disclosure. As referenced above, in some exemplary embodiments, well-known processes, well-known device structures, and well-known technologies may not be described in detail.

The disclosed allows for a market exchange platform for connecting manufacturers and merchants in a cost and time efficient manner to reduce the cost of goods and to maximize the sales without creating excess inventory. The system may allow for the tracking of orders from a merchant at the inception of a good order to the sale of the good by the merchant. Tracking of a good may allow for each manufacturer to be rated on their efficiency in terms of both cost and time which may allow for various vendor ratings to be assigned to each of the manufacturers and merchants using the market exchange platform.

The present invention may also more easily facilitate licensing relationship and create broader use and exploitation of various copyrighted and other intellectual property. For example, the market exchange platform may have included therein a license repository in which various licenses and other intellectual property germane to a potential good may be purchased or otherwise aligned with a produced good, regardless of whether or not the manufacturer or merchant had prior access or permission to use the licensed material.

Retail merchants often employ "just-in-time" and like inventory strategies to the purchasing and stocking of items in inventory. These strategies seek to determine an amount of inventory that will be needed at a given point in time to satisfy expected or predicted customer demand. The purchasing of only a predetermined amount will generally lower costs otherwise associated with holding items in inventory, whether for additional full retail sales or for sale at a discount when such inventory may be stale. Such real time strategies are highly applicable where merchants seek to either rapidly fill small orders to meet unique demand or to timely fill an inventory gap while demand is still high. Although such a situation may often occur during periods of seasonal sales (e.g., Black Friday, Cyber Monday, Christmas, "fourth quarter (Q4)," etc.), elements such as customer demand variability, vendor supply availability, opportunity cost of being out-of-stock, risk of being overstocked, and/or a fulfillment center's capacity consumption has more frequently begun to occur during the whole year. Thus, it may be advantageous to depart from the "off-peak," real time approach, in a manner that reduces the financial costs of purchasing and storing sub-optimal amounts of inventory—e.g., too much or too little inventory.

Accordingly, in some embodiments, a method may include implementing a real time purchasing plan for an item to be manufactured and stocked in inventory prior to the arrival of a promotional purchasing period. In some cases, a promotional purchasing period may precede a seasonal sales period (e.g., the seasonal purchasing period may include several days or weeks leading up to a holiday or the like when the increased sales will actually take place). In other cases, the promotional purchasing period may overlap or at least partially coincide with the seasonal sales period. Promotional purchasing may include the ordering of goods which seek to exploit a fad or temporal market demand for a certain good or category of good. The method may include receiving, via a merchant portal, an indication of one or more purchasing goals to be achieved during the promotional purchasing period and receiving, via the merchant portal, an indication of one or more operational constraints and/or risks corresponding to the promotional purchasing period. The method may also include evaluating a financial cost function with a multi-constraint optimization model to provide a promotional purchasing plan for the item during the promotional purchasing period based, at least in part, on the one or more purchasing goals and the one or more operational constraints and/or risks.

In other embodiments, a system may include at least one processor and a memory coupled to the at least one processor, where the memory stores program instructions. The program instructions may be executable by the at least one processor to cause the system to receive an indication of one or more purchasing goals corresponding to an item to be stocked in inventory during a specified time period, where at least one of the one or more purchasing goals is different during the specified time period than outside of the specified time period. The program instructions may also be executable to cause the system to receive an indication of one or more operational constraints and/or risks corresponding to the specified time period, where at least one of the one or more operational constraints or risks is different during the specified time period than outside of the specified time period. The program instructions may further cause the system to evaluate a financial cost function with a multi-constraint optimization model to provide a purchasing plan for the item during the specified time period based, at least in part, on the one or more purchasing goals and the one or more operational constraints and/or risks, where at least one of the one or more business goals or the one or more operational constraints or risks causes the purchasing plan to depart from another purchasing plan employed outside the specified time period.

In yet other embodiments, a non-transitory computer-readable storage medium may have program instructions stored thereon that, upon execution by a computer system, may cause the computer system to receive an indication of one or more purchasing goals and operational constraints and/or risks corresponding to an item to be delivered to a merchant for sale during a specified time period, where at least one of the one or more purchasing goals and operational constraints or risks is different during the specified time period than outside of the specified time period. The program instructions, upon execution by the computer system, may also cause automatic purchasing of the item to implement the purchasing plan during the specified time period by evaluating a financial cost function with a multi-constraint optimization model based, at least in part, on the one or more purchasing goals and operational constraints and/or risks, where at least one of the one or more purchasing goals and operational constraints and/or risks causes the purchasing plan to depart from a real time plan employed outside the specified time period.

An embodiment of a clearinghouse configured to administrate inventory items is illustrated in FIG. 1. As illustrated, integration clearinghouse 100 includes a receiving module 120, an item tracker 130 configured to store information on an arbitrary number of inventory items 135*a-n*, and a packing/shipping module 140. The arrangement of the various areas within integration clearinghouse 100 is depicted functionally rather than schematically. For example, in some embodiments, multiple different receiving modules 120, item tracker 130 and packing/shipping module 140 may be interspersed rather than segregated. Additionally, integration clearinghouse 100 includes an inventory management system 150 configured to interact with each of receiving module 120, item tracker 130 and packing/shipping module 140.

Integration clearinghouse 100 may be configured to receive different kinds of inventory items 135 from various suppliers and to store them until a customer order specifying particular ones of items 135 is received. The particular items 135 may then be selected from at least one storage area and ship to a customer. The general flow of items through integration clearinghouse 100 is indicated using arrows. Specifically, as illustrated in this example, items 135 may be received from one or more suppliers, such as manufacturers, distributors, wholesalers, etc. at receiving module 120. In various embodiments, items 135 may include merchandise, commodities, perishables, or any suitable type of item depending on the nature of the enterprise that operates within integration clearinghouse 100.

Integration clearinghouse 100 may be interconnected to at least one supplier interface 160 and supplier database 165. Similarly, clearinghouse 100 may be interconnected to at least one customer interface 160 and customer database 165. Through a supplier interface 160, a customer may inform the inventory management system 150 of at least one item request which may include various parameters which may inform suppliers of particular item requirement of the customer such as time to delivery, price, item specific design and construction characteristics, and production attributes.

The organization and operation of integration clearinghouse 100 described above is given as an example. In other embodiments, a integration clearinghouse 100 may be arranged differently and operate differently than described above. For example, some embodiments of integration clearinghouse 100 may not have a dedicated receiving module 120. In such embodiments inventory management system 150 may directly receive orders, for example. In general, integration clearinghouse 100 may employ any organization and operational flow for handling inventory and fulfilling orders.

In an embodiment of the present invention, the integration clearing house may provide for more efficient production practices and a more streamlined flow of goods between a manufacture and a customer. Such efficiencies may reduce unutilized inventory levels and the various costs typically associated with holding items in storage for any period of time. Such efficiencies may lower storage costs, for example, as well as recurring real estate costs (e.g., lease costs, debt service, etc.), personnel costs, facilities costs (e.g., utilities, maintenance, etc.) and any other costs associated with the chain of goods between a manufacturer and the ultimate consumer.

In addition to storage costs, the excess production of goods may also result in capital or economic costs related to the price paid to obtain the item. That is, once working capital or cash flow is committed to a unit of an item 135 (e.g., once that unit is paid for), that economic value is not available for other purposes; the committed value is "tied up" in the corresponding inventory. Depending on the accounting scheme used to manage the costs of inventory, a cost of debt or other time-value-of-money cost (also referred to as an economic cost) may be associated with the price paid for a given unit of an item 135. For example, in an embodiment an effective annual interest rate of 6% may be applied to the price paid for a unit of inventory and may continue to accrue until that unit is sold or otherwise disposed of. In some cases, economic costs may be applied to storage costs in addition to the price paid for a unit of inventory.

When deciding how much inventory to purchase for a particular planning period or demand item, a merchant may attempt to balance the benefits of holding sufficient inventory to satisfy customer demand against the potential harm of holding too much inventory and incurring some of the costs outlined above. A "surplus cost" for an item is the cost a merchant may incur by purchasing one more unit than would otherwise have been purchased if the exact demand for that item had been known. A "missed sale cost" of the same item is the cost that the merchant may incur by purchasing one fewer unit of the item than would be purchased if the exact demand were known. Ordering one more unit of the item generally increases the probability of surplus cost and decreases the probability of a missed sale, whereas ordering one less unit generally increases the probability of a missed sale and decreases the probability of a surplus.

Generally, a merchant may seek to minimize any missed sale surplus costs, at least during steady state periods. Inventory for an item may be purchased according to an optimal ratio. The optimal ratio for a particular item is a parameter corresponding to the probability of remaining in stock for the item throughout a promotional purchasing period given a demand forecast for the promotional purchasing period. Using a higher value for critical ratio will typically result in a higher target inventory level, and a lower critical ratio value will typically lead to a lower target inventory level for the promotional purchasing period. A purchasing plan may be produced for a particular item according to a particular critical ratio and demand forecast. The purchasing plan will indicate to a buy a quantity of the item to meet the corresponding target inventory level taking into account inventory already on hand or already on order. Traditionally, the task of adjusting critical ratios has been an ad hoc process. A person in charge of a particular retail item may directly or indirectly make adjustments to an optimal ratio as a tuning parameter to attempt to compensate for variabilities that arise at different times during the year, such as during a holiday season. Once the appropriate optimal ratio is determined, it is then possible to calculate a re-order quantity based in part on the new optimal ratio and the demand forecast for the item.

Figure 2:
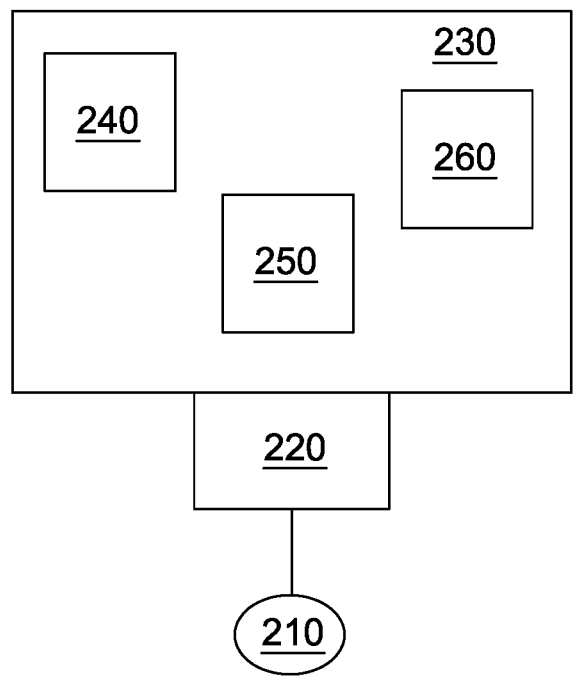
FIG. 2 is an embodiment of the present invention.

In an embodiment of the present invention, a contract award and tracking software module may be incorporated with the integration clearinghouse 100. As illustrated in FIG. 2, a block diagram of a contract award and tracking (CAT) software module is depicted according to some embodiments. Generally speaking, CAT module 230 may be configured to generate purchasing plans that, when executed, cause orders to be automatically sent to suppliers or vendors requesting that specified quantities of items be shipped to one or more of the merchant's fulfillment centers at predetermined times. As illustrated, module 230 is configured to provide user interface 220, which allows user 210 to interact with CAT module 230 and access some or all of its various features. In some implementations, user interface 220 may be a graphical user interface (GUI) or a web-based user interface (WUI) that implements Java™, AJAX, Adobe® Flex®, Microsoft®.NET, or similar technologies to enable real-time user control. Additionally or alternatively, user interface 220 may be a command line interface or the like.

In some cases, user 210 may be an instock or retail manager in charge of one or more of a merchant's products or a product manager for the merchant, or other user. As such, user 210 may interact with CAT module 230 to create, develop and/or analyze one or more purchasing plans. For example, during a first portion of the calendar year, user 210 may wish to implement a just-in-time purchasing plan—or some other "lean" inventory technique—that reduces in-process inventory and associated carrying costs. Moreover, during another portion of the calendar year, user 210 may implement a different purchasing plan that better fits his or her business goals while obeying certain operational constraints and/or seeking to account for one or more supply chain risks. For example, during a merchant's seasonal sales period, it may be advantageous to depart from the just-in-time approach and stock additional inventories of certain items. As such, user 210 may operate CAT module 230 to create any number of purchasing plans for these various items.

In some embodiments, CAT module 230 may be configured to receive from user 210 one or more business goals to be achieved during a particular time period, as well as one or more operational constraints and one or more supply chain risks corresponding to that period. CAT module 230 may then evaluate a financial cost model to provide a purchasing plan for the item based on the business goals and/or operational constraints and/or risks. Models that are suitable for implementation by CAT module 230 are described in more detail below. In some embodiments, in evaluating the financial cost model, CAT module 230 may also receive information from inventory management module 240, purchasing module 250, and/or forecasting and simulation module 260.

In certain embodiments, CAT module 230 may utilize a set of rules or specifications (e.g., Application Programming Interface (APIs)) that access or make use of the services and resources provided by inventory management module 240, purchasing module 250, and/or forecasting and simulation module 260. Generally speaking, some or all of modules or elements 230-260 may be bi-directionally interconnected such that each such module is configured to send and receive messages from other modules. As shown in this particular embodiment, CAT module 230 may communicate with each of inventory management system 240, purchasing module 250, and/or forecasting and simulation module 260. In addition, one or more of these various elements may have its own user interface (not shown) to allow independent user access.

In some embodiments, inventory management module 240 may be a software application residing within inventory management system 150 shown in FIG. 1. As such, inventory management module 240 may include an inventory database corresponding to items 135 stored tracked in item tracking 130. Such a database may generally be configured to store any kind of data related to items 135. For example, the database may store records that relate an identifier for a particular item 135 (e.g., a vendor or merchant's stock keeping unit (SKU) identifier) with an identifier that may be specific to integration clearinghouse 100. The database may also include information regarding the quantity of each item presently in stock, for example. Moreover, for one or more of items 135, an inventory database may contain an associated expiration date, expiration time, shelf life, or the like.

In various embodiments, the inventory database may include any suitable type of application or data structure that may be configured as a persistent data repository. For example, the database may be configured as a relational database that includes one or more tables of columns and rows and that may be searched or queried according to a query language, such as a version of Structured Query Language (SQL). Alternatively, the database may be configured as a structured data store that includes data records formatted according to a markup language, such as a version of eXtensible Markup Language (XML). In other embodiments, a database may be implemented using one or more arbitrarily or minimally structured data files managed and accessible through any suitable type of application.

In addition to an inventory database, inventory management module 240 may also include information regarding certain operational constraints that are particular to integration clearinghouse 100. For example, inventory management module 240 may indicate inbound stream constraints (e.g., characteristics or limitations related to receiving module 120), storage constraints (e.g., maximum number of inventory units that can be stored in item tracking 130), as well as other types of inventory constraints (e.g., inventory value, inventory cube, etc.).

Forecast and simulation module 260 may be configured to make certain predictions and simulations that may be useful in evaluating a financial cost model over a long period of time (e.g., 4, 6, 12 weeks, etc.) and/or multiple planning periods. For example, module 260 may be configured to determine a demand forecast for a particular item by estimating the quantity of the item that is likely to be sold within a specified planning horizon. In some cases, forecasting module 260 may employ quantitative methods and/or historical data to predict future demand for a given item. In addition to calculating a demand forecast, module 260 may determine a forecast magnitude risk (e.g., the risk that the forecast will be under- or over-biased) and/or a forecast timing risk (e.g., the risk that the timing of the actual demand will be different than the forecast). Module 260 may also be configured to determine a vendor lead time accuracy risk (e.g., the risk that vendors will take longer to ship and/or transport products to the merchant than what is predicted), a weather delay risk (e.g., the probability that weather concerns will affect inbound traffic and/or fulfillment center operations), allocated product supply risk (e.g., the risk of ongoing supply shortage that a merchant will not be able provide the item), and/or vendor supply risk (e.g., the risk of intermittent or short term supply shortage or probability that a given item will become unavailable from a vendor for some period of time). A technique for detecting supply risk is described later in this document. Other risks may also be taken into account in generating a purchasing plan, such as other transportation risks, internal backlog risks, etc. In some embodiments, one or more of these variables may be used by CAT module 230 in evaluating a financial cost model or the like to determine a purchasing plan.

Purchasing module 250 may be configured to implement a purchasing plan devised by CAT Module 230 and/or selected by user 210. To that end, purchasing module 250 may include a database of purchasing channels, vendor, costs, etc. In operation, module 250 may receive an indication from CAT module 230 as to a quantity of a particular item to be repurchased and/or the timing of such repurchasing. Purchasing module 250 may then communicate directly with vendors, suppliers and/or carriers to execute purchasing plans.

Each of modules or elements 230-260 may dynamically process information that changes over time. For example, a new sales channel may, become available for a given item 135, or an existing sales channel may no longer be available for that same item. Also, the sale value of an item may decrease or increase over time. Similarly, new and existing purchasing channels, as well as corresponding re-buy costs, may be subject to change. Demand forecast may also be a function of the planning horizon and/or may vary at any given time. Further, the contents of the inventory database may change when units of new or existing items are shipped to or from integration clearinghouse 100. Therefore, in some embodiments, the information provided to and/or generated by each of modules 230-260 may be continuously or periodically updated to reflect changes in disposition, repurchasing, forecast, and/or inventory conditions. In some cases, such updates may be automatically performed. In other cases, some or all of these updates may be implemented by user 210.

In some embodiments, one or more of CAT module 230, inventory management module 240, purchasing module 250, and forecasting and simulation module 260 may be part of inventory management system 150, although these modules need not reside within integration clearinghouse 100. Moreover, when an enterprise operates two or more fulfillment centers or warehouses, elements 230-260 may be common to some (or all) such fulfillment centers. In some embodiments, elements 230-260 may reside in a number of different computing systems distributed throughout an enterprise. For example, certain financial data may be stored in an accounting, database associated with an accounting department that may be distinct from elements 230-260.

In various embodiments, the modules shown in FIG. 2 may represent sets of software routines, logic functions, and/or data structures that are configured to perform specified operations. Although these modules are shown as distinct logical blocks, in other embodiments at least some of the functionality provided by these modules may be combined in to fewer blocks. Conversely, any given one of modules 230-260 may be implemented such that its functionality is divided among a two or more logical blocks. Moreover, although shown with a particular configuration, in other embodiments these various modules may be rearranged in other suitable ways.

Figure 3:
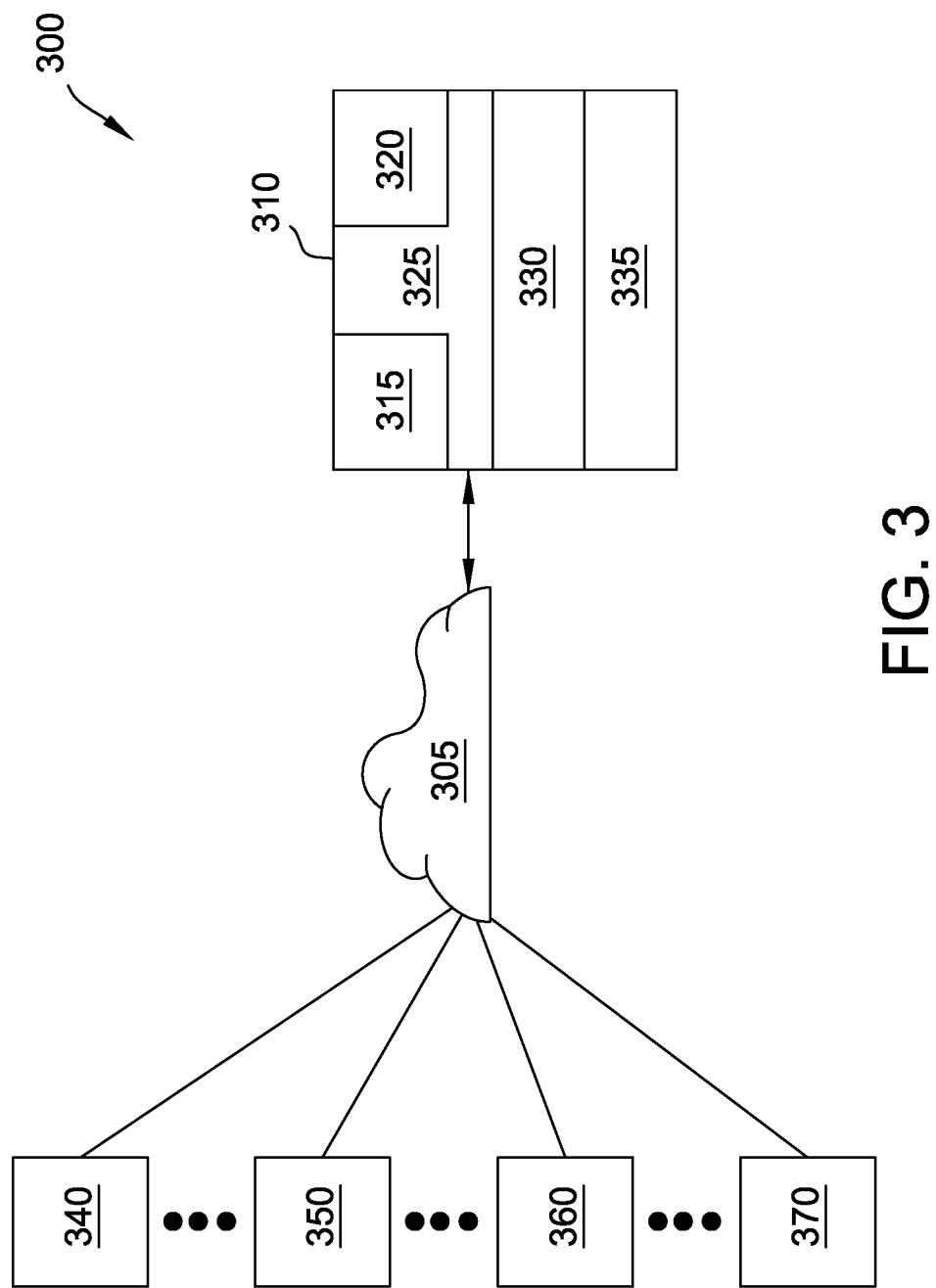
FIG. 3 is an embodiment of the present invention.

The present invention may also help improve cash flows by handling access to credit facilities and the like and by, for example, leverage holdings in value arising throughout the chain of commerce handled through the market exchange platform. The present invention may also gather information from news and social media sources and integrate gathered information into buying suggestions for merchants and/or score the risk of financing of various good orders put through the platform. As illustrated in FIG. 3, data collection system 300 may provide detailed information to at least CAT module 230 and may provide artificial intelligence tools that may assist in planning of purchasing and other events. Data collection system 300 may be connected through interface 305 to multiple sources of information, such as, for example, social media sources 340, news sources 350, government information 360, and financial data 370. Social media sources 340, for example, may include any social media platforms and may collect and search for keyword trends that may inform system 300 of information useful for the planning of cost effective purchase orders from merchants, for example. Similarly, news collection 350 allows access to news gathering organizations and aggregators to provide real time information about events and happenings in geographical defined regions. Government information 360 may include publically distributed information from any local, State or Federal government source and may further include private digests and summaries of the same ilk. Financial data 370 may include bank and financial markets information, as well as private digests and summaries of such information that are indicative of financial trends and forecasts.

Each data collection source may provide data to data receiver 325 of artificial intelligence machine 310 for processing which may include keyword searching, parsing of text phrases, word counts, and the like as would be known to those skilled in the art of natural language processing. Machine 310 may also include manufacturer attributable data 315 and merchant attributable data 320 which may include information germane to one or more of the users connected to CAT module 230. Such information may include, for example, system identified scoring, as discussed above, financial information, past and present order/fulfillment contracts, geographical location, customer profiles, channels of trade, customs performance, time to delivery/sale of certain goods, and target production quotas and item type, for example. As would be known to those skilled in the art, any number of merchant and manufacturer information points may be collected and used within machine 310.

The data receiver layer 325 may correlate and/or filter received information and send the same to artificial intelligence (AI) layer 330. The AI layer 330 may use the received information to create a number of choices for each of the merchants and manufacturers using the platform. For example, AI layer 330 may provide a forecast to a merchant that a specific type of toy is calculated to be a profitable item for sale and may provide the window in which such sales may be the most profitable, the amount a particular merchant should sell in a specific region, a suggested price point, and at least one manufacturer who may produce the toy. The manufacturer data may include time to delivery, costing, efficiency ratings generated by the system, and other relevant data for presenting to the merchant a relevant product sale opportunity. Although this is just one example, as would be appreciated by those skilled in the arts, the AI layer 330 may help synthesis any number of relationships between ones of the merchants, manufacturers, suppliers, and credit facilities, for example. The AI layer 300 may provide data to the reporting layer 335 to be processed for further use by system 300 and other connected aspects of the present invention.

Figure 4:
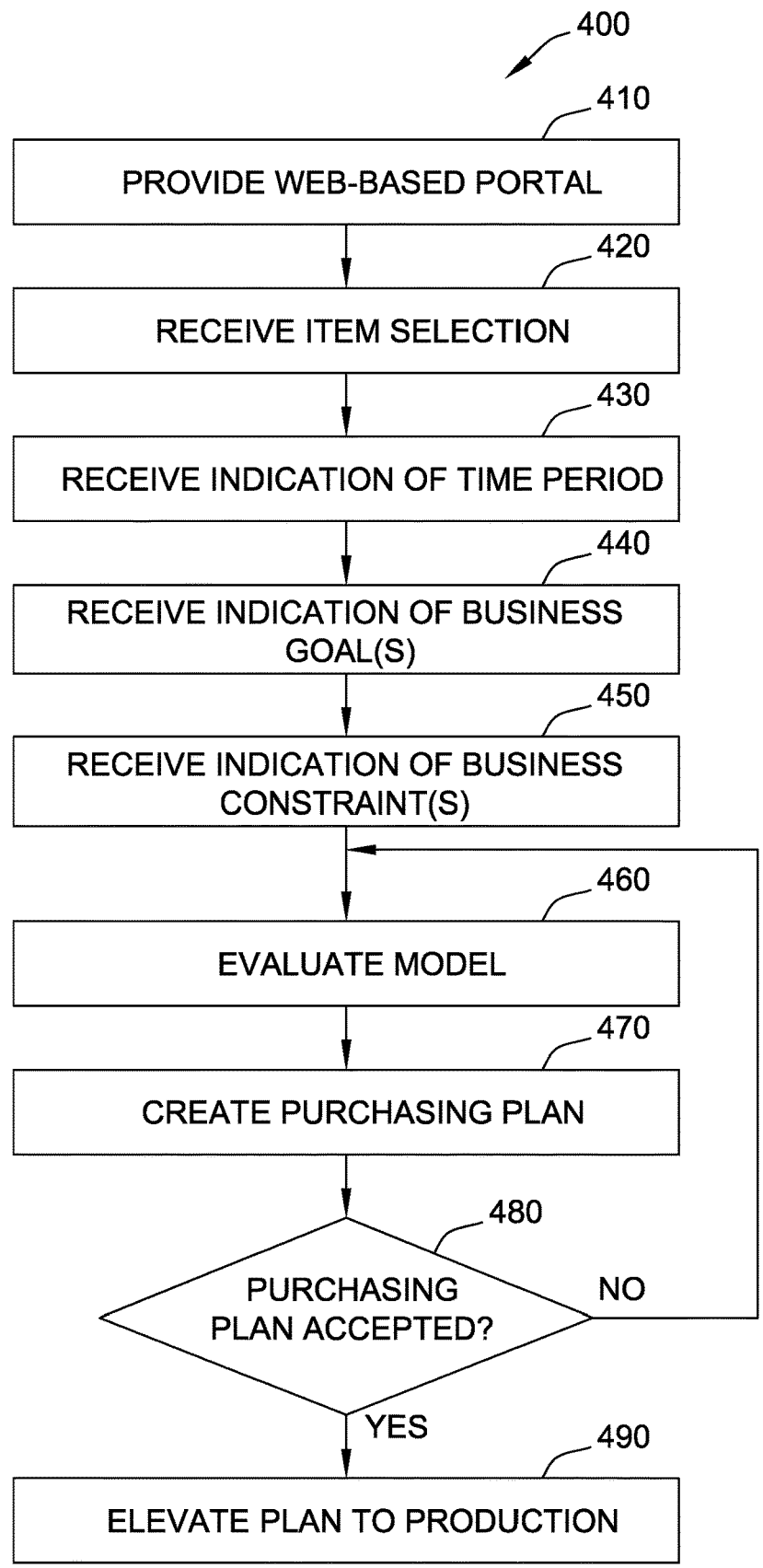
FIG. 4 is a flow chart outlining aspect of the present invention.

Turning now to FIG. 4, a flowchart of a method for inventory planning and control is depicted according to some embodiments. In some embodiments, method 400 may be performed by CAT module 230. At block 410, CAT module 230 may provide user 210 with a planning portal through user interface 220. For example, the planning portal may be a web-based portal or any other type of interface. In some cases, CAT module 230 may allow user 210 to sign-in to use the planning system. Once the user's credentials have been verified against a database, CAT module 230 may allow user 210 to perform a series of actions to devise a purchasing plan for a given item or set of items.

At block 420, CAT module 230 may receive a purchase order. In some cases, the selected item may be one or more of items 135 shown in FIG. 1. In other cases, the item may be of a type that is not currently stored in fulfillment center 100. To help the user identify the item, the planning portal may present user 210 with a drop-down list of items. Additionally or alternatively, the planning portal may allow the user to search of an item by name, brand, manufacturer, Universal Product Code (UPC), product description, etc. The planning portal may also allow user 210 to manual enter a new item in the system. In some embodiments, items may be classified according to one or more hierarchical groups such that one or more categories may include one or more sub-categories.

At block 430, CAT module 230 may receive an indication of a time period to which the purchasing plan is intended to apply. For instance, a merchant may be currently implementing techniques to minimize an amount of inventory on-hand during a period where fulfillment-related variables are in relative steady-state. When user 210 operates CAT module 230, the user may desire to address a different time period (e.g., a "peak" or "seasonal" time period) that is expected to introduce stress conditions in the merchant's fulfillment systems. In some embodiments, the time indication or selection made at block 430 may cover one or more subsequent planning periods for the item, and the financial cost model evaluated in block 460 may be configured to account for one or more subsequent re-orders corresponding to the one or more subsequent planning periods. For example, CAT module 230 may determine that a selected item is under a particular ordering cycle, that the simulation date is off that cycle, and may consider planned orders that will take place in the future when devising a purchasing plan.

At block 440, CAT module 230 may receive an indication of one or more business goals from user 210. An example of a business goal includes an instock probability (i.e., a probability that an item will not run out of stock during a particular planning period). Another example of a business goal includes an inventory value (i.e., a dollar amount that is desired to be held in inventory). Another example of a business goal includes a required return on inventory investment. However, any other suitable business goals may be used. In some embodiments, the selected business goal(s) may be different from a goal currently being pursued through an existing purchasing or re-ordering plan.

CAT module 230 may, at block 450, receive an indication of one or more operational constraints (or other type of fulfillment-related constraints) and one or more risks. In some embodiments, these operational constraints and risks may be provided to CAT module 230 by user 210. In other embodiments, however, CAT module 230 may obtain one or more constraints and risks from other modules (e.g., modules 240-260 in FIG. 2) and/or may determine the constraint(s) or risks on its own. Examples of operational constraints include an inbound inventory constraint and an inventory holding constraint. Constraints may be input or determined as a specific quantity, such as a maximum inventory capacity constraint. Examples of risks include a weather delay risk, a demand forecast risk, a vendor lead time risk, or an allocated product supply risk. Another example includes a risk that a supplier will stock out of the item during the seasonal period. The latter example is discussed in more detail below and illustrates a situation in which CAT module 230 may automatically calculate a risk.

At block 460, CAT module 230 may evaluate a multiple constraint optimization or financial cost model that takes into account one or more of the received business goals and operational constraints and risks. Additionally or alternatively, CAT module 230 may request that forecasting and simulation module 260 perform at least a portion of the model's evaluation. Using the output of the model, at block 470 CAT module 230 may create a purchasing plan for the selected item for the specified time period (e.g., a "seasonal purchasing plan" corresponding to a "seasonal purchasing period"). For example, the output of the model may be formatted into a series of one or more commands that may be interpreted and implemented by purchasing module 250. In alternative embodiments the output of the model may already be a native format that is suitable for processing by purchasing module 250. In some cases, given the specified business goals, it may not be possible for block 460 to find a satisfactory solution without violating one or more operational constraints (and vice-versa). In those cases, CAT 230 may alert the user and/or it may apply a tradeoff between two or more of the operational constraints and/or business goals at block 460.

The devised purchasing plan may be displayed to user 210 via the planning portal at block 480. User 210 may analyze the purchasing plan using one or more tools that enable reconfiguration of the selected item, time period, business goals, risks, and/or operational constraints to simulate alternative inventory and/or purchasing scenarios. If user 210 chooses to alter or fine tune one or more of these variables, control returns to block 460 and the model may be re-evaluated. Once the user accepts a given purchasing plan, at block 490 CAT module 230 may elevate the accepted plan to production. For example, CAT module 230 may transmit the purchasing plan, along with its associated commands or instructions, to purchasing module 250.

Figure 5:
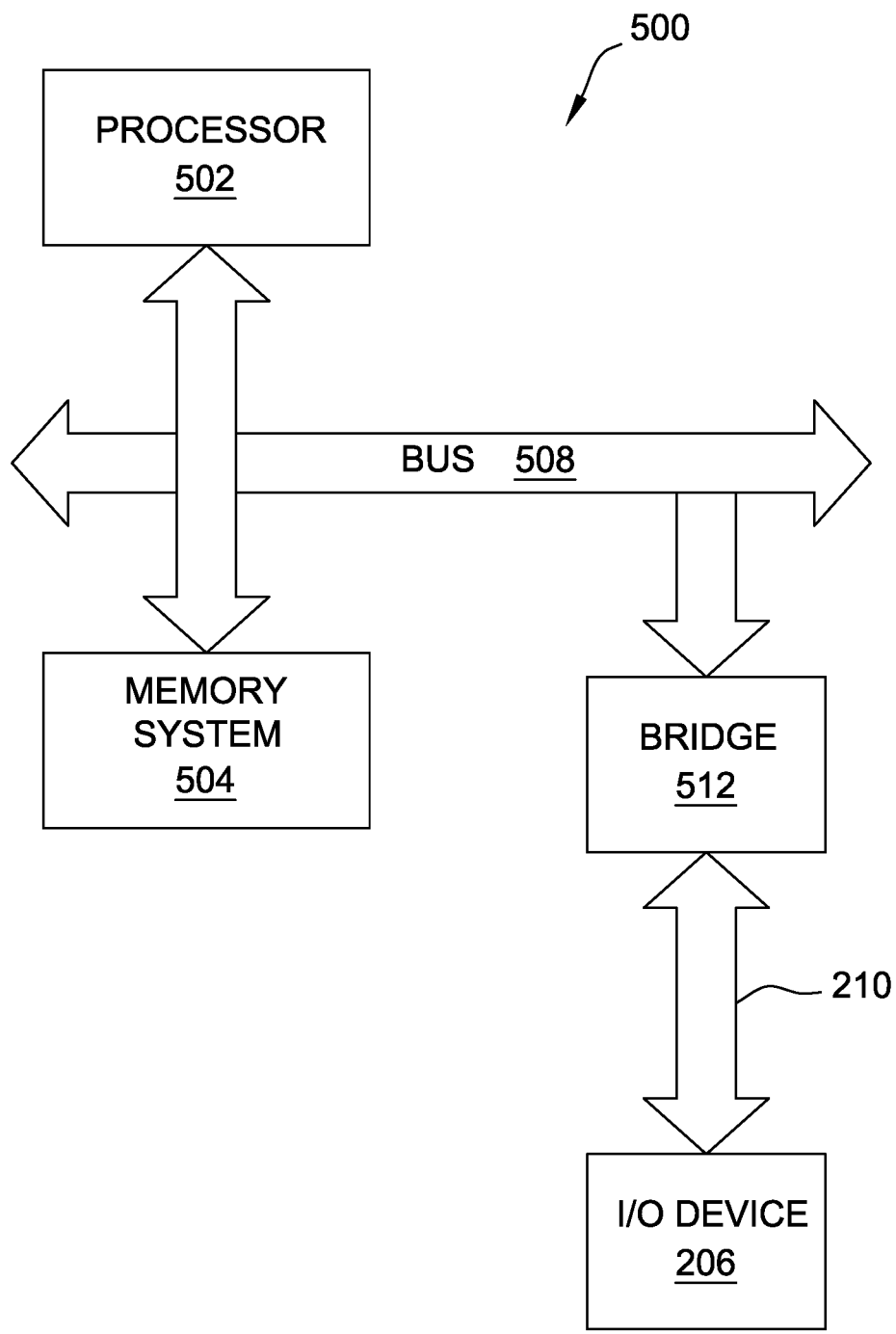
FIG. 5 is an embodiment of the present invention.

As shown in FIG. 5, the computer system 500 includes a processor 502, a memory system 504 and one or more input/output (I/O) devices 206 in communication by a communication 'fabric' in further communication with integration clearinghouse 100. The communication fabric can be implemented in a variety of ways and may include one or more computer buses 508, 210 and/or bridge and/or router devices 512 as shown in FIG. 5. The I/O devices 206 can include network adapters and/or mass storage devices from which the computer system 500 can send and receive data for generating and transmitting advertisements with endorsements and associated news. The computer system 500 may be in communication with the Internet via the I/O devices 206.

The various illustrative logics, logical blocks, modules, and engines, described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

Additionally, some or all of the methods or techniques described above and illustrated, may be implemented as a web service that may be performed on behalf of clients requesting such a service. Generally speaking, providing a function or service as a web service may encompass providing any of a variety of standardized APIs configured to allow different software programs to communicate (e.g., to request services and respond to such requests) in an autonomous, web-based and typically platform-independent manner. For example, an enterprise may choose to expose certain enterprise data (e.g., catalog data, inventory data, customer data or other types of data) and/or certain enterprise functions (e.g., query functions, electronic commerce functions, generic data storage or computational functions, etc.) to external customers (or, in some embodiments, internal clients) via a web services interface. Applications could then access the exposed data and/or functions via the web services interface, even though the accessing application may be configured to execute on an entirely different platform (e.g., a different operating system or system architecture) than the platform hosting the exposed data or functions. Similarly, an enterprise may elect to provide clients with access to inventory management analysis services, such as inventory health determination, expiring product analysis, purchase offer analysis, counteroffer analysis or other such services. For example, clients may provide inventory details via a web services interface and request various kinds of analysis through that interface. Alternatively, an enterprise may elect to provide physical management of inventory on behalf of clients, and may analyze client-owned inventory in a manner similar to enterprise-owned inventory, exposing the results of such analysis to clients as a web service.

In some embodiments, provisioning a web service may encompass the use of particular protocols which may be executable to publish available web services to potential users, to describe the interfaces of web services sufficiently to allow users to invoke web services properly, to allow users to select and differentiate among web services for a particular transaction, and to provide a format for exchanging web services data in a flexible and platform-independent manner. Specifically, in an embodiment a provider of a web service may register the service using a version of the Universal Discovery Description and Integration (UDDI) protocol, which may function as a general directory through which potential resource users may locate web services of interest. The web service provider may also publish specific details regarding how a well-formed web services request from a user should be formatted (e.g., what specific parameters are required or allowed, the data type or format to be used for a given parameter, etc.). For example, such interface details may be published (e.g., within a UDDI directory entry) using a version of the Web Services Description Language (WSDL).

Those of skill in the art will appreciate that the herein described apparatuses, engines, devices, systems and methods are susceptible to various modifications and alternative constructions. There is no intention to limit the scope of the invention to the specific constructions described herein. Rather, the herein described systems and methods are intended to cover all modifications, alternative constructions, and equivalents falling within the scope and spirit of the disclosure, any appended claims and any equivalents thereto.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A computer-implemented engine for generating a verified business contract, over a network, responsively to input company information comprising at least one certified information input, comprising:
    a processor for locally querying a contract requester for the input company information comprising at least general company information, at least one company attribute, company presence information, third party market information, proposed goods to be purchased, and the at least one certified information input;
    at least one network port for remotely receiving the company information;
    at least one rules engine communicatively connected to said at least one network port, and comprising a plurality of rules to generate, responsively to the input company information, at least one verified business contract of the company correspondent to the proposed goods to be purchased, the at least one verified business contract configured to optimize an inventory of the proposed goods to be purchased during a predetermined period of time, the at least one verified business contract comprising one or more commands;
    a computer processor for convert the one or more commands of the at least one verified business contract from a first format to a second format, wherein the one or more commands in the second format are suitable for processing by a purchasing module, wherein the purchasing module is executable by at least one processor;
    the at least one rules engine communicatively coupled to the purchasing module, and in response to acceptance of the at least one verified business contract, said computer processor to transmit the at least one verified business contract to the purchasing module, wherein the one or more commands of the at least one verified business contract is executable by the purchasing module; and
    in response to receiving the verified business contract, automatically executing, by the purchasing module, the one or more commands, wherein the one or more commands cause a quantity of one or more goods to be purchased and/or shipped to a fulfillment center at least once during the predetermined period of time.

2. The computer-implemented engine of claim 1, wherein one of the plurality of rules comprises an indication of time correspondent to the validity of the at least one verified business contract.

3. The computer-implemented engine of claim 1, wherein the at least one verified business contract comprises a purchasing plan.

4. The computer-implemented engine of claim 1, wherein the at least one certified information input comprises a value correspondent to at least one financial rating of the company.

5. The computer-implemented engine of claim 1, wherein the at least one certified information input comprises one selected from the group consisting of a credit report; a bank statement, a form of personal identification, a mortgage statement, and a letter of intent.

6. The computer-implemented engine of claim 1, wherein the at least one company attribute comprises a business goal of the company.

7. The computer-implemented engine of claim 1, wherein the third party market information comprises the name of at least one company competitor.

8. The computer-implemented engine of claim 1, wherein the third party market information comprises the name of at least one company customer.

9. A computer-implemented method for purchasing and distributing goods, comprising:
   receiving, through a user interface, an intention to purchase at least one good based on at least one term;
   a processor for evaluating the intention to purchase based on the at least one term and at least one attribute of the purchaser;
   generating, through at least one rules engine comprising a plurality of rules to generate, responsively to the at least one attribute of the purchaser, at least one verified business contract to purchase the at least one good, the at least one verified business contract configured to optimize an inventory of the proposed goods to be purchased during a predetermined period of time, the at least one verified business contract comprising one or more commands;
   a computer processor for converting the one or more commands of the at least one verified business contract from a first format to a second format, wherein the one or more commands in the second format are suitable for processing by a purchasing module, wherein the purchasing module is executable by at least one processor;
   in response to receiving an indication of acceptance of the at least one verified business contract, said computer processor to transmit the at least one verified business contract to the purchasing module, the purchasing module configured to execute the at least one verified business contract; and
   executing, by the purchasing module, the one or more commands, the one or more commands causing transmission of at least one message to at least one of a vendor, a supplier, or a carrier, the at least one message causing a quantity of the at least one good to be purchased and/or shipped to a fulfillment center at least once during the predetermined period of time.

10. The method of claim 9, wherein the at least one attribute comprises a value correspondent to at least one financial rating of the company.

11. The method of claim 9, wherein the at least one term is selected from the group consisting of delivery date, quality of good, cost of good, delivery location, materials used, and fulfilment amount.

\* \* \* \* \*